April 13, 1943.　　　P. F. RICE　　　2,316,365
CONTROL MEANS FOR RADIO APPARATUS
Filed Feb. 19, 1925　　　4 Sheets-Sheet 1
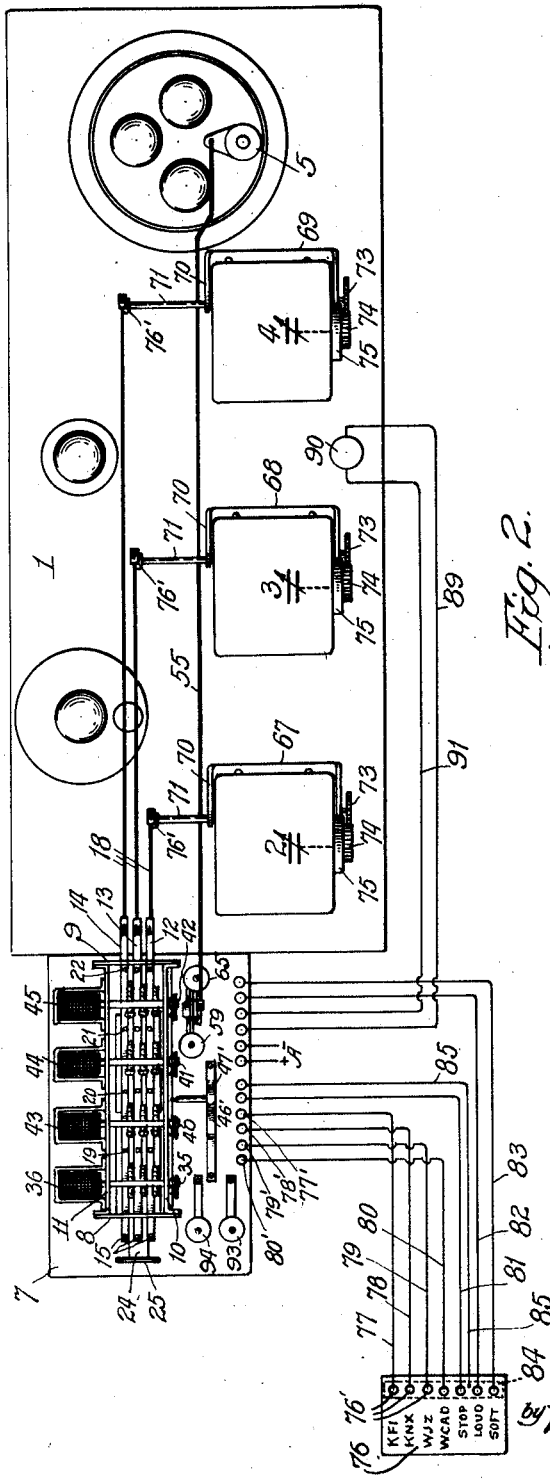
Inventor:
Percy F. Rice,
by Wallace R. Lane
Atty April 13, 1943.  P. F. RICE  2,316,365
CONTROL MEANS FOR RADIO APPARATUS
Filed Feb. 19, 1925   4 Sheets-Sheet 3

Inventor.
Percy F. Rice,
by Wallace R. Lane
Atty.

April 13, 1943. P. F. RICE 2,316,365
CONTROL MEANS FOR RADIO APPARATUS
Filed Feb. 19, 1925 4 Sheets-Sheet 4

Inventor:
Percy F. Rice,
by Wallace R. Lane
Atty.

Patented Apr. 13, 1943

2,316,365

UNITED STATES PATENT OFFICE 2,316,365

CONTROL MEANS FOR RADIO APPARATUS

Percy F. Rice, Tustin, Calif., assignor, by mesne assignments, to Radio Corporation of America, New York, N. Y., a corporation of Delaware Application February 19, 1925, Serial No. 10,190

59 Claims. (Cl. 250—40)

The present invention relates to control means for radio apparatus.

One of the objects of my invention resides in providing a device whereby the tuning means of a radio apparatus may be automatically set or adjusted for any selected frequency by the actuation of manually operative means.

A further object of my invention resides in providing means whereby the frequency adjusting means of a radio apparatus may be automatically adjusted for any desired frequency, the radio apparatus automatically started and automatically stopped by the actuation of a manually operative means located directly at the radio apparatus or at any desired distance therefrom.

Another object resides in providing such a device in which the frequency adjusting means may be manually adjustable independently of the means for automatically adjusting it.

Still a further object of this invention resides in providing a device which by the operation of manually actuated means will automatically tune a radio receiving set to any selected station, start the set and automatically stop as desired and if desired will automatically adjust the volume or amplitude.

A further object of my invention resides in providing simple electrical control means whereby the automatic means for selectively adjusting the setting means of the radio apparatus may be suitably controlled at a distance from the radio apparatus by the operation of manually actuated means.

Another object of the invention resides in the provision of means for automatically resetting the tuning means to normal position, preferably zero setting, prior to effecting different selected adjustment of the tuning means.

A further object of this invention resides in providing means for maintaining the radio apparatus in operation after the actuation of the manually operative means until it be desired to automatically stop the apparatus by the actuation of the manually operative means.

Another object of the invention resides in the means for automatically increasing or diminishing the sound volume of the radio receiving set by the actuation of manually operative means.

Another object of my invention resides in the means for retarding the movement of the adjustably shiftable tuning dial when automatically operated so as to permit the dial to be moved more slowly during the automatic tuning operation so that other stations may be noted.

These and other objects of my invention will be apparent from a perusal of the following specification when taken in connection with the accompanying drawings wherein:

Figure 1 represents a plan view of my automatic station selector as attached to a commercial receiving set, namely an Atwater-Kent receiving set.

Figure 2 is a front view of the same.

Figure 11:
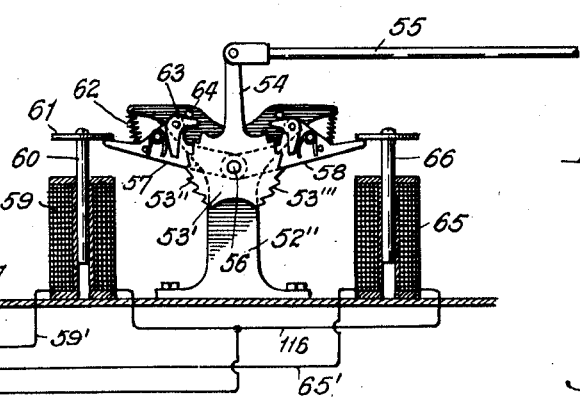

And, Figure 11 is a detailed view of the automatic means for effecting the volume or amplitude adjustment.

While the principles of my invention are applicable broadly to radio apparatus, for purposes of exemplification they will be illustrated and disclosed as applied to a radio receiving set. In order to bring out most clearly a simple, structural form of my invention, I shall illustrate it as applied in the form of an attachment to a well known commercial type of machine known as the Atwater-Kent receiving set. It is apparent, however, that the invention may be permanently incorporated as a part of a radio set and embodied in various structural forms and that the one illustrated is selected only for the purposes of clearly exemplifying the invention.

In general, when my invention is applied to a radio receiving set it comprises broadly, manually actuated means operatively connected, through the intervention of certain automatically operating mechanism, to the desired adjustable members of the radio receiving set, for example, the tuning means, the volume control, and a desired circuit part of the radio set, whereby the receiving set may be automatically started, either at a distance from or at the set, to receive a desired frequency, may be automatically stopped, may be automatically actuated to receive a different frequency, may be automatically operated to vary the volume of the sound, and at the same time the various adjusting means of the receiving set are free for manual adjustment in case the automatic control is not desired.

Referring now to the drawings in detail, the radio receiving set is illustrated in Figures 1 and 2 as comprising a support 1 on which are mounted inter alia the tuning means and the volume control. In this particular machine the tuning means comprises the three condensers 2, 3 and 4, each of which is provided with the usual rotatably adjustable turning dial on the front thereof. These dials are not disclosed in the drawings since they are enclosed by the detachable connections hereinafter described. The volume control 5 comprises an oscillatable arm hereinafter referred to. Since the details of construction of this Atwater-Kent radio set are well known to those skilled in the art, no further description thereof will be given.

The illustrated embodiment of my invention comprises means to automatically actuate the adjustable condensers 2, 3 and 4 which constitute the tuning means, and the adjustable volume control 5. In such form, this automatic means comprises a support 6 which may be screwed or otherwise fastened directly to the support 1 of the radio receiving set. This support 6 in turn forms a mounting for a main panel 7 formed of desired insulating material and upon which the automatic means is directly mounted.

In general, the automatic means mounted on the panel 7 comprises; one or more shiftable actuators, depending upon the number of the condensers or tuning means, each actuator being operatively connected to a condenser; means for shifting each actuator to effect a selected setting or adjustment of the condenser and, or, to neutralize or place the condenser in normal which is preferably zero setting; one or more shiftable frequency selectors, depending upon the desired number of frequencies or stations the device is adapted for, each such selector comprising one or more adjustable members to correspond to the number of actuators, and each adapted to cooperate with an actuator to vary the throw thereof and accordingly alter the adjustment of the condensers shifted thereby. In addition the automatic means comprises contact means operable to open or close a circuit part of the radio set and operative connections to manually operable means located either directly on the support for the automatic means or at any desired distance so that the radio set can be automatically operated remotely from the device; and volume or amplitude controlling means.

Figure 6:
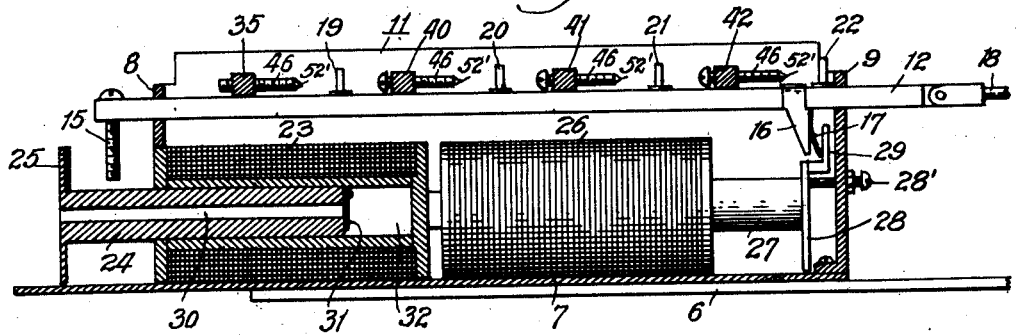
Figure 6 is a view showing the actuator electromagnet and actuator clearing or neutralizing electro-magnet.
Figure 7:
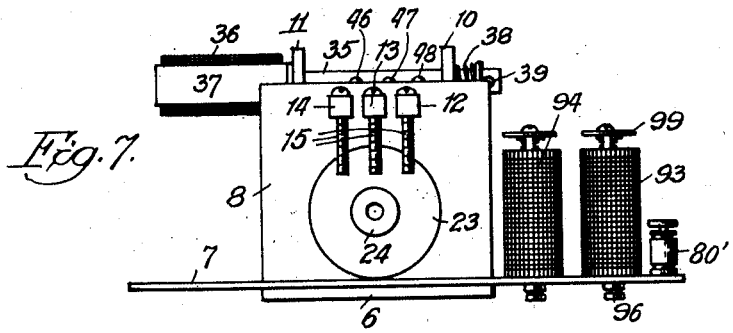
Figure 7 is a view looking from the left end of Figure 3.
Figure 8:
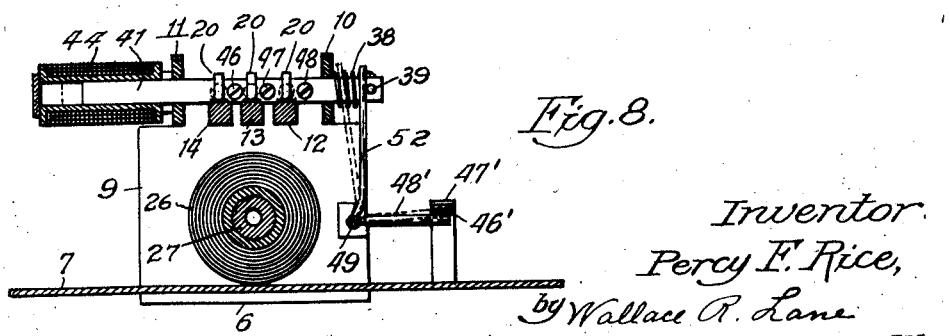
Figure 8 is a section on line 8—8 of Figure 3 looking in the direction of the arrows.
Figure 9:
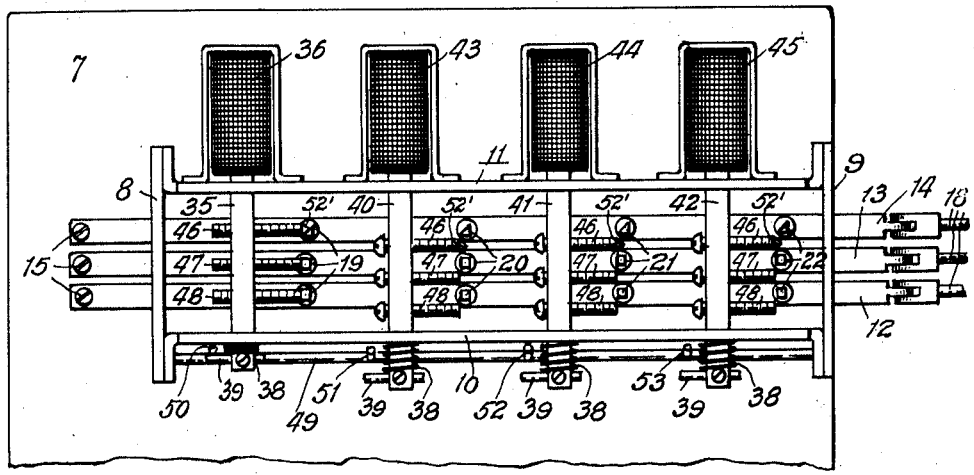
Figure 9 is a view corresponding to Figure 3 except that the selector bars have been shifted to a desired setting of the tuning means.

Specifically the automatic means on the panel 7 includes a substantially rectangular support consisting of the two end plates 8 and 9 and the two relatively long front and rear plates 10 and 11. These plates are suitably fastened together and to the panel 7 so as to form a skeleton-like housing or support for the various shiftable members 12, 13 and 14 of the automatic means. The shiftable members or actuators are mounted in the end plates 8 and 9 and slide in suitable perforations therethrough. There are three of these actuators, one for each of the condensers. Each of these actuators comprises a bar preferably formed substantially rectangular in cross-section so as to prevent rotation in the perforations of the end plates 8 and 9. The left end of each actuator bar is provided with means for permitting the bar to be shifted toward the right. A simple means consists of a screw 15 which depends downwardly as illustrated clearly in Figure 6. The opposite end of each actuator is provided with a downwardly depending finger 16 which may be adjustably fastened to the actuator bar. Each finger 16 in addition is provided with an outwardly projecting leaf spring 17 the purpose of which will hereinafter be explained. The extreme right end of each actuator bar is provided with a hinged rod 18 for connection to the condenser adjusting means shown in Figure 10. In addition, each actuator is provided with a series of stops or abutments 19, 20, 21 and 22, corresponding in number to the desired number of frequencies or stations for which the apparatus is adapted. These stops are arranged at spaced intervals along the length of the actuator bar.

Means is provided for shifting each actuator bar 12, 13 and 14 to effect a selected setting or adjustment of the condenser and, or, to neutralize or place the condenser in normal, preferably zero, setting. In the present instance each bar is shifted, for example, to the left to effect the desired frequency adjustment or settting of the condenser or in other words to effect the desired tuning, and is again shifted preferably reversely or to the right to return the condenser setting to any desired normal position, preferably a zero setting. In the embodiment selected the actuator bars 12, 13 and 14 are shifted by means of suitable electro-magnetic devices. There are two of these devices, one provided with a solenoid 23 and a suitable armature 24 and the other with a solenoid 26 and an armature 27. These electro-magnetic devices are arranged with their axes aligned centrally of the frame-like structure and, as clearly shown in Fig. 6 the end of the armature 24 is provided with an upstanding plate 25, thus adapted to be shifted by the solenoid to actuate the depending pin 15 to shift the actuator bars 12, 13 and 14 to the right. The other electro-magnet 26 is identical in construction and its armature 27 is provided at its outer end with an end plate 28 likewise formed with an upstanding flange 29 arranged in the path of the springs 17 and fingers 16 so as to throw the actuator bars 12, 13 and 14 to the left. In order to cushion the actuating movement of the armatures 24 and 27, each armature is provided with a central bore such as 30 and upon the inner end of the armature is swingably mounted a perforated flap valve 31, the perforation of which permits air gradually to escape from the closed end of the solenoid core 32 as the armature moves inwardly. An unrestricted reverse movement of the armature is permitted by reason of the hinged connection of the flap valve 31. The operative speed of the armatures is determined by the size of the perforations or orifices in the flap valve 31. Thus armature 24 may operate at a slow speed with a small orifice and armature 27 at a faster speed with a larger orifice. It is simply a matter of releasing the air from behind the armature at a determined speed. By means of this construction when automatic tuning is being accomplished the dial or dials will be shifted more slowly so that any stations which will come in while the dials are being turned to their final automatically set position, may be noted. The travel of the armature 27 to the extreme right is adjustably limited by means of the screw 28'. Obviously the electro-magnetic devices 23 and 26 may be operated from any suitable source of electricity such for instance as the ordinary lamp socket; however, in the present instance they are preferably operated from the A battery of the radio device as will be hereinafter more fully explained.

The automatic means mounted on the panel 7 also comprises one or more shiftable, frequency selectors, the number depending upon the desired number of frequencies or stations the device is adapted for, each frequency selector comprising one or more adjustable members adapted to cooperate with an actuator and to vary the throw thereof and accordingly alter the adjustment of the corresponding condenser. In the specific embodiment illustrated, each frequency selector comprises a selector bar mounted to slide in registering apertures in the front and rear plates 10 and 11 respectively. There are as many such selector bars as there are stations or frequencies for which the machine or device is adapted. In other words, if the machine be constructed to receive four different stations or four different frequencies, as in the embodiment illustrated here there will be four of the selector bars. If it be desired to have a ten station reception there will be ten of the selector bars. These bars, designated 35, 40, 41 and 42 are thus shiftably mounted preferably transversely of the line of movement of the actuators 12, 13 and 14. Means is provided for positively shifting each of these bars in a desired direction whereby to control the actuating movements of a corresponding actuator bar. This movement may be accomplished by means of an electro-magnet if desired. For instance, selector 35 is provided with a solenoid 36 mounted on the rear of panel 11 by means of a support 37 and the selector 35 is adapted to be sucked into the solenoid when the coil 36 is energized. The reverse shifting movement of the selector 35 is accomplished by coil spring 38 confined between the front panel 10 and a cross pin 39 detachably mounted on the front end of selector 35. The other selectors 40, 41 and 42 are similarly actuated by means of their respective electromagnets 43, 44 and 45.

Figure 3:
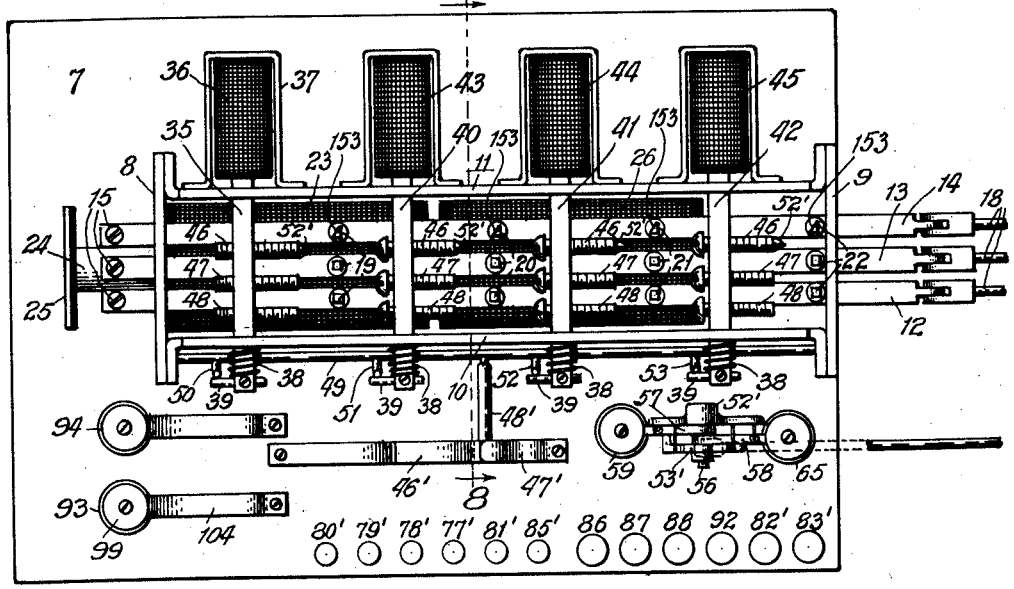
Figure 3 is a plan view of one form of the automatic means for effecting the shifting of the tuning dials of the radio apparatus.

Each selector bar is provided with adjustable means for controlling the movement of an actuator bar, according to the number thereof. For instance, if there be one tuning means, that is, one tuning dial control, there will be one actuator and hence only one adjusting means carried by the selector whereas if there be three dial controls there will be three actuators and hence three adjusting means carried by each selector. In the present instance each adjusting means comprises the set screws 46, 47, 48 mounted in spaced relation on each selector and arranged so that when the selector 35 is shifted rearwardly, referring to Figure 3, each of the adjusting means 46, 47 and 48 will be moved into registry with the path of movement of the actuators 12, 13 and 14 so that the stops thereon when the actuators are shifted to the left will be brought into contact with the ends of the adjusting means. In this way the throw or travel of the actuator will be varied according to the adjustment of the adjusting means. It must be manifest that a more elaborate arrangement of adjusting means may be provided instead of the simple screws shown and that various other arrangements of stops and adjusting means may be utilized.

Means are provided for opening and, or, closing a circuit part of the radio device upon the operation of each or any of the selectors 35, 40, 41 and 42 or of the actuators. This preferably comprises the spaced contacts 46' and 47' mounted upon panel 7. These contacts are connected by means of appropriate wiring to any desired circuit part of the radio receiving set so that when this circuit is closed the radio receiving set will be started and when these contacts 46' and 47' are broken the radio receiving set will be stopped. A simple connection consists in electrically connecting the contacts 46' and 47' in series in the A battery circuit. Contacts 46' and 47' which are normally spaced apart are closed by means of an arm 48' which projects forwardly from an oscillatable rod 49 mounted in suitable brackets on the front plate 10. Rod 49 is provided with four upstanding fingers 50, 51, 52 and 53 which lie in the path of movement of the cross bars 39 rigidly mounted on the front ends of the selector bars 35, 40, 41 and 42 respectively. Thus when the selector bars are shifted rearwardly the cross bar 39 will likewise be shifted to contact with the upstanding fingers and will oscillate the rod 49 to make the circuit part of the radio receiving set. When each solenoid 36, 43, 44 and 45 is de-energized the springs 38 automatically turn the selector bars outwardly to automatically break the circuit part of the radio receiving set. It will thus be noted that no matter which frequency setting is selected the circuit part of the radio receiving set is automatically controlled.

Means are provided for retaining the selector bars in inwardly shifted position after having once been drawn into such position by the electro-magnetic means or any other automatic means. Thus the radio device may be started and maintained in operation by the simple operation of a manual control such, for instance, as by pressing a button or operating a hand control and thereafter releasing it. In the present instance this is very simply accomplished by providing one or more of the adjustable means 46 with a pointed end 52' and by providing the corresponding one or more of each set of stops 19, 20, 21 and 22 with a beveled or inclined face 153 so arranged that when the shifter or actuator bars 12, 13 and 14 carrying the stops are brought into contact with the end of the screw 46 the beveled surface will ride behind the point of the screw 46 and maintain the screw in retracted position even against the forcing tension of the spring 38. However, when the actuator is withdrawn the spring 38 will be instantly operable to return the selector bar 35 to outward position and thus break the circuit part of the radio receiving set.

Amplitude or volume varying means is provided on the panel 7 and is adapted to be automatically controlled by a manually operative means located either directly on the panel or at a distance therefrom. This automatic volume varying means is constructed and arranged to be manually operative independent of the means for actuating it automatically. In the specific embodiment of this device, there is provided an upstanding bracket 52" directly mounted on the panel 7 which bracket has pivoted to the upper portion thereof a substantially sector-like member 52'. This member is provided with ratchet teeth 53" and 53'" on each of its opposed sector-shaped wings and in addition is provided with an upstanding control rod 54 having a pivoted connection to a rod 55 which in turn is pivoted to the volume adjusting means 5 on the support 1 of the radio receiving set. The pivotal axis 56 of the bracket 52" has also mounted thereon two outwardly extending arms 57 and 58. These arms extend in opposite directions and the opposite ends thereof are arranged within the path of movement of armatures on spaced apart electro-magnets. By reference to Figure 11 it will be noted that the panel 7 has mounted thereon at the left of the bracket 52″ an electro-magnet comprising the solenoid 59 and the armature 60, the upper portion of which has a head 61 extending over the outer end of the arm 57. The spring 62 normally maintains the arm in upward position. The arm 57 carries thereon a spring pressed pawl 63 which is pivotally mounted to engage the teeth of the sector to oscillate the same. A stop 64 arranged on the bracket 52″ is arranged to automatically cause the tooth of the pawl 63 to disengage in a ratchet tooth as the armature 60 is thrust upwardly. The spring of the pawl on the downward movement of the armature 60 and consequently the downward pivotal movement of the arm 57, causes the pawl 63 to advance the sector the distance of one tooth. When the armature 60 is returned to upward position and the solenoid 59 is deenergized, the pawl will ride freely over the sector teeth until thrown out by stop 64 and will be ready to advance the sector the distance of another tooth when the solenoid is energized a second time. In this manner a step by step movement of the control rod 54 imparts progressive shifting to the volume control member on the radio receiving set. Inasmuch as the opposite side of the sector 53′ is similarly controlled by a solenoid 65 and its armature 66, when this electro-magnet is energized, the sector 54 will be reversely swung and accordingly the rod 55 will be moved in the opposite direction thereby to correspondingly shift the opposite control means. The electro-magnets 59 and 65 are selectably operated by means of suitable electrical connections to a manually operative means as hereinafter described or they may be controlled directly by means of a manually operative member located on the panel 7.

Figure 10:
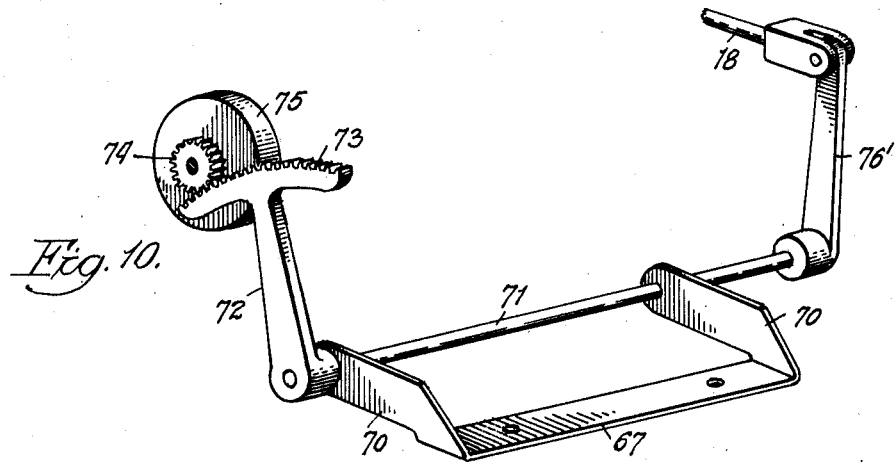
Figure 10 is a detailed view of the bracket and sector arm portion detached from a tuning dial.

A simple manner of operatively connecting the rods 18 to the tuning dials of the condensers 2, 3, 4, is disclosed in Figure 10 of the drawings. In this construction a plurality of brackets 67, 68 and 69, are attached to the support 1 of the radio receiving set, preferably at the base of each condenser. For instance, these brackets may be attached to the condenser brackets as by screws. Each bracket preferably comprises the spaced arms 70 which constitute bearings for an oscillatable shaft 71 upon the forward end of which is mounted a sector arm 72, the teeth 73 of which gear with teeth 74 formed on cap 75 adapted to detachably slip over the condenser dial projection. Obviously any manner of means forming an oscillatable connection may be availed of. The opposite end of shaft 71 is provided with a rigid arm 76′ which pivotally connects to each rod 18. By this means when the rod 18 is shifted the sector 72 is correspondingly oscillated to give the desired throw of movement to the condenser adjusting means.

Manually operative means is provided for effecting the operation of the automatic means whereby to actuate the various adjusting means. This manually operative means may be situated either directly at the radio receiving set, such for instance as being incorporated as a part thereof or being mounted directly on the panel 7, or the manually operative means may be located at any desired distance from the radio receiving set and automatic means.

In the present embodiment the manually operative means is disclosed as operative from any desired distance from the receiving set and its attachment. In this embodiment the manually operative means consists of a panel 76 provided with a plurality of push buttons, including a separate push button for each frequency desired, that is for each station the set is adapted to automatically receive, and in addition a stop button and also two other buttons, the one for the loud volume control and the other for the soft volume control.

Referring to Figure 1 of the drawings, wherein the several push buttons are represented at 76 the top button of the panel 76 is provided with a wire connection 77, the next lower button with a wire connection 78, the next lower button with a connection 79, and the fourth from top button with a wire 80. The "stop" button has a wire connection 81. The "loud" button a wire connection 82, and the "soft" button a wire connection 83. All of these buttons are interconnected to a common ground by means of a common connection 84 located on the under side of the panel 76. This common ground connection 84 is provided with a ground wire 85. It must be evident that any desired type of electrical control means may be used in lieu of the multi-button panel shown and described. And it is understood that the term manually operated means is to be interpreted broadly.

The front of panel 7 is provided with a series of upstanding posts which provide means for electrically connecting the various wires 77, 78, 79, 80, 81, 82, 83, 84 and 85, to the automatic means mounted on panel 7. For instance, wire 77 is electrically connected to post 77′, wire 78 is connected to post 78′, wire 79 is connected to post 79′, wire 80 is connected to post 80′, wire 81 is connected to post 81′, wire 85 which constitutes the ground wire is connected to post 85′, wire 82, for the loud control, is connected to post 82′ and wire 83 for the soft control is connected to post 83′. Post 86 on panel 7 and post 87 on panel 7 are connected to the positive and negative poles of the source of current, for instance the A battery. Post 88 of panel 7 is adapted to be electrically connected by a wire 89 to the under terminals of the starting jack contacts 90 mounted on the support 1. This starting jack is the usual type of jack found on the well-known Atwater-Kent receiving set. The other wire 91 from starting jack 90, is connected to a post 92 on panel 7. Post 92 is connected underneath the board to one end of the movable contacts 47′, while the other post 88 is connected to the other movable contact 46′ of the mechanically operated contacts of a circuit part of the radio set.

It is preferred, but not necessary, to operate the electro-magnetic devices 23 and 26 for the actuator bars, not from a source of current of a lamp socket but from the A battery. To this end two electro-magnetic circuit closers 93 and 94 are mounted on the panel 7. The circuit closer 93 is adapted to actuate solenoid 26 while the electro-magnet circuit closer 94 is adapted to actuate the solenoid 23.

Figure 4:
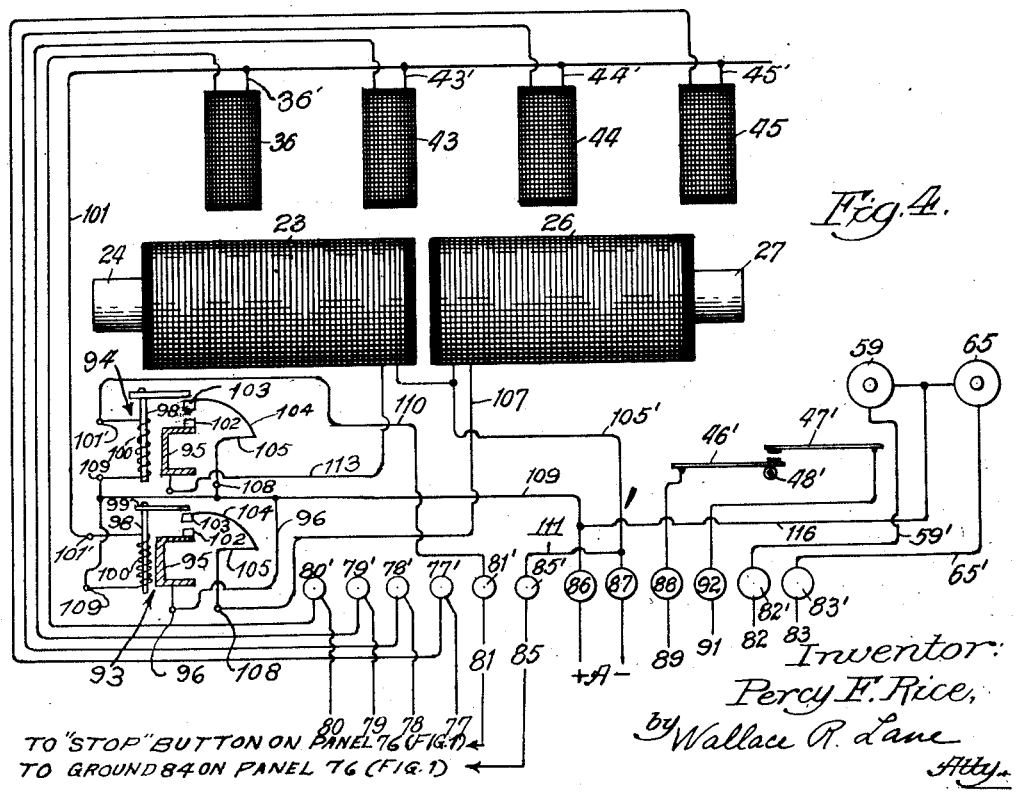
Figure 4 is a diagrammatic view of the electrical connections thereof.
Figure 5:
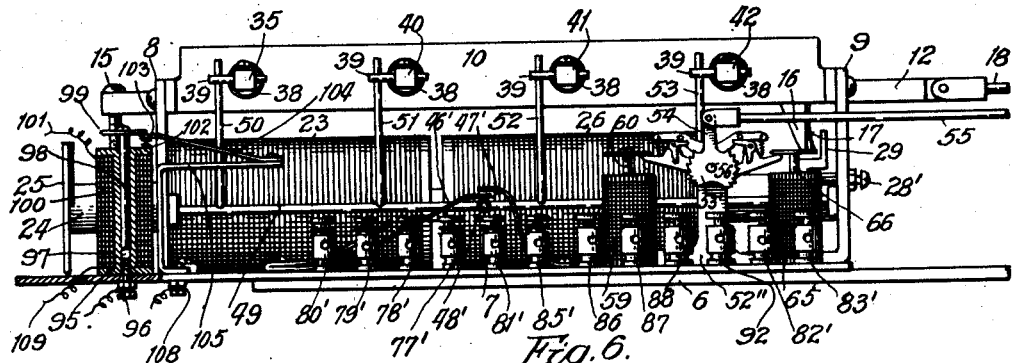
Figure 5 is a front view of the automatic mechanism mounted on the supporting board.

Inasmuch as the construction and operation of each one of the electro-magnetic circuit closers 93 and 94 are identical, description of one only will be given. Each of these electro-magnetic devices comprises a core 95 which is fastened directly to the panel 7 by means of a fastening device 96 which forms a terminal for one of the conducting wires. This core is provided with a central bore 97 in which operates an armature 98 which is provided with an upper head 99. The core is surrounded by a winding 100, one end 101' of which winding is connected to wire 101 which is in electrical contact with each winding of the respective selector solenoids 36, 43, 44 and 45 as by wires 36', 43', 44' and 45', see Figure 4. The other end 109' of the solenoid winding 100 is connected to wire 109 leading to post 86 which connects with one pole of the source of current for A battery. The upper portion of the core 95 is provided with a contact 102 which is adapted to cooperate with a movable contact 103 mounted on the end of a leaf spring 104 carried by a bracket 105 mounted on panel 7 by means of a fastening device 108 which provides a wire terminal. The head 99 of armature 98 overhangs contact 103 so that when the armature 98 is sucked into the solenoid 100 the head 99 will bring contacts 102 and 103 together. They are normally separated by means of the spring 104. When these contacts are closed a circuit is made through the actuator solenoid 36 by means of the battery circuit and current will flow from the A battery to post 87, to wire 105', to the solenoid 26, to the opposite wire 107, terminal 108, bracket 105, thence to leaf spring 104, contacts 103, 102, core 95, to contact 96, to wire 96', to wire 109, back to post 86 and thence back to the battery. When this circuit is broken the leaf spring 104 raises the armature 98 to its upper position.

Electro-magnetic device 94 is similarly connected to the "stop" button on panel 76 by means of the wire 81 which connects the post 81'. This post in turn connects by means of suitable wiring 110 to one end of 101' of the winding 100 of electro-magnetic device 94, the opposite end of which winding connects with wire 109 running back to post 86 connecting with the A battery, through this battery to the other contact of the A battery, thence to post 87, thence by means of a wire 111 back to post 85', thence to wire 85, thence to the common ground connection 84 on panel 76 to complete the stop circuit. When the winding of such magnetic device 94 is energized its armature is pulled down which also pulls down leaf spring 104 to complete the circuit through solenoid 23. Current will now flow from the A battery to post 87, to wire 105', to solenoid 23, then to the other wire 113 thereof, the core contact 96 of the electro-magnetic device 94, core 95, contacts 102, 103, to leaf spring 104, to bracket 105 and terminal 108, to wire 109, back to post 86 and back to the other terminal of the battery thus energizing electro-magnet 23 which actuates the actuator bars 12, 13 and 14 to shift them to the right. This is the neutralizing or clearing shift to reposition or reset the condenser.

The operation of the volume control electromagnets 59 and 65 is effected by means of the wires 82 and 83 running to posts 82' and 83' on the panel 7 which posts connect by means of wire 59' and 65' respectively to the solenoids 59 and 65. These solenoids have a common wire 116 which connects with battery post 86 and thence through battery A to post 87, to ground 85 connected to the common ground connection 84 on panel 76. Each time one of the volume control buttons is pressed the corresponding solenoid is energized to effect an incremental shift of the particular volume control—either the loud adjustment or the soft adjustment.

In the operation of the above described device the adjusting screws 46, 47 and 48 of each selector bar are adjusted so that the desired stations can be received. For instance, the screws 46, 47 and 48 of selector bar 35 are set so that the three condensers when adjusted in accordance with the setting will give the desired frequency of the station to which that particular selector bar corresponds. In the same manner the adjusting screws 46, 47 and 48 of the three remaining selector bars 40, 41 and 42 are each also preliminarily adjusted to produce the pretuning of the condensers which are controlled by the travel of the actuators as regulated by such adjusting screws for any particular selector bar. After all of the sets of screws have been adjusted the device is ready for automatic actuation. The operator may be stationed in the same room with or at any desired distance from the radio receiving set. By pressing the button of any particular station the solenoid of the selector bar corresponding to that station will be energized to shift the predetermined selector bar and position the stops thereof into the path of subsequent movement of the actuator bars. At the same time the circuit is made through the electro-magnetic device 93 and thereafter the circuit through the actuator solenoid 26 is made to cause the shifting of the actuator bars 12, 13 and 14 to the left so that the stops thereon will be brought into contact with the ends of the adjusting screws 46, 47 and 48 which have been shifted by means of the selector bars into the path of travel of the stops. This will determine the travel of the actuator bars 12, 13 and 14 and hence will determine the amount of oscillation of the sectors 72 and the amount of corresponding oscillation of the condensers. Thus, desired adjustment of the condensers is automatically affected. It will be noted that when a particular button is pressed only one of the selector bars is actuated so that only one set of adjustable stops 46, 47 and 48 is positioned in the path of movement of the stops on the actuator bars 12, 13 and 14. The function of the leaf spring 17 interposed between the finger 16 and the upstanding flange 29 on the armature 28 is to permit the flange 29 to completely shift each of the fingers fully to the left irrespective of the adjustment of any particular adjusting screws 46, 47 and 48 and the consequent stoppage of any particular actuator bar. In other words that adjusting screw which projects farther to the right will be contacted first and will stop further movement of the contacting actuator bar. However, since the leaf spring is interposed it will permit this bar to remain in such arrested position while the upstanding flange 29 is forcing the remaining actuator bars to a further position due to the fact that such corresponding adjusting screws may not be adjusted so that their ends project as far to the right as that of the first adjusting screw. The adjusting screw 28' shown in Figure 6 of the drawings permits adjustments of the initial position of the armature 28. It must be evident that each one of the actuator bars may be controlled by a separate electro-magnet if desired in which case the springs 17 are not necessary.

As before stated when a particular selector or electro-magnet is actuated and the solenoid 26 is energized the circuit to the circuit part of the radio device is also made by means of the automatic actuation of the contacts 46' and 47'. This is due to the operation of the member 48' as controlled by the upstanding fingers 50, 51, 52 and 53 which in turn are shifted by stop 39 on the end of any particular selector bar which is selected for energization. It will also be remembered that the contacts 46' and 47' are maintained in closed position by means of the wedge-like surface 153 of one of the uppermost stops 19, 20, 21 and 22 engaging the end 52 of one of the screws 46.

When it is desired to "stop" the machine, the stop button on the panel is pressed and circuit is made through the solenoid 23 whereby to shift the actuator bars 12, 13 and 14 to the right thereby returning the condenser to a normal setting and also repositioning the member 43' whereby the contacts 46' and 47' can automatically open due to their own resiliency so that the circuit part of the radio apparatus is broken. The device is then ready for the selection of another station. This selection may be made subsequently by pressing any other desired button.

It will be noted that the rod 13 connected to the condensers may be manipulated independently of the automatic means, that is that the condenser dials may be manually adjusted when it is not desired to use any one form of the automatic means of the device. It is also apparent that the volume control can be also manually adjusted independent of the automatic means.

Having thus described my invention, I claim:

1. In combination with an adjustably shiftable tuning means of a radio apparatus, a manually operable member and means actuated in response to the operation of said member for selectively shifting the tuning means for effecting a selected frequency setting of the tuning means and for automatically controlling a circuit part of the radio apparatus.

2. In a radio apparatus, a plurality of manually adjustable means for effecting tuning, a plurality of manually operable means, means actuated by the operation of a manually operable means for automatically shifting a selected manually adjustable means for automatically effecting a desired frequency setting of the tuning means.

3. In combination with an adjustably shiftable tuning means for a radio apparatus, a shiftable actuator connected thereto, a plurality of independently operable selectors each adapted to be operatively associated with the actuator, a plurality of pushbuttons adapted to be located remote from the radio apparatus, and electrical devices operatively connecting said actuator, selectors and buttons for automatically shifting the tuning means a desired distance upon pressing a desired button.

4. In combination with an adjustably shiftable tuning means of a radio apparatus, manually operated control means located remote from said radio apparatus, and means operably connected to said tuning means and to said control means for automatically shifting the tuning means for automatically effecting a selected frequency setting of the tuning means and for controlling a circuit part of the radio apparatus while at a distance from said radio apparatus.

5. In combination with the shiftable tuning means of a radio apparatus, a plurality of pushbuttons adapted to be located remote from said radio apparatus, and electrical devices operatively connecting said tuning means and said pushbuttons and actuated upon the operation of a desired button for automatically shifting the tuning means a selected amount to effect tuning.

6. In a radio apparatus, a plurality of manually adjustable means for effecting tuning, a plurality of manually operable means, means actuated in response to the operation of a manually operable means for automatically shifting a selected adjustable means for automatically effecting a desired frequency setting of the tuning means, said automatic means being constructed and arranged to permit the independent manual adjustment of said tuning means.

7. In combination with a shiftable tuning means of a radio apparatus, an actuator having a series of stops, a plurality of selectors having cooperative stops, manually operable means and devices actuated in response to the actuation of said means for shifting a desired selector and for shifting the actuator to effect desired tuning.

8. In a radio receiving device, in combination with tuning means shiftable to varying positions of adjustment, manually operable means, means actuated automatically in response to the operation of said manual means automatically for positively shifting the adjustable means a preselected amount, and means for controlling a circuit part of the radio device to start the device and thereafter automatically to control a circuit part to stop the operation of the device.

9. In a radio receiving device, in combination with the adjustable tuning means, manually operable means, means operatively connected to said tuning means and to said manual means automatically to effect a desired shifting of the adjustable tuning means to effect setting of the tuning means and automatically to restore said tuning means to original position on operation of said manually operable means.

10. In a radio receiving device, in combination with the adjustable tuning means, manually operable means, means operatively connected to said tuning means and to said manual means and adapted on actuation of said manual means automatically to effect a desired shifting of the tuning means and thereafter automatically to effect a different desired shifting of the tuning means.

11. In combination with a radio receiving set having adjustable tuning means, of actuatable means connected to the tuning means of the radio receiving set, means for moving said actuatable means, means for selectively adjusting the movement of said actuatable means to correspond to a predetermined setting of the tuning means, manually operable means, and connections therefrom to the selecting means and to the means for operating said actuatable means whereby to automatically operate the latter upon the actuation of the manual means.

12. In combination with a plurality of tuning dials of a radio receiving set, a plurality of actuatable members each connected to a tuning member, a plurality of selectors, said selectors and actuatable members having adjustable cooperative stop members for adjustably limiting the travel of said actuatable members, manually operative means operatively connected to said selectors and to said actuatable members and adapted to effect the operation of a desired selector and the actuatable members to effect the desired setting of the tuning means.

13. In combination with the adjustable tuning means of a radio receiving set, a movable actuator operatively connected to said tuning means, means for moving said actuator, a stop carried by said actuator, a selector, a cooperative stop thereon, means for effecting an adjustment between said stops whereby to limit the movement of said actuator, manually actuated means and connections therefrom to said selector and said actuable member whereby to cause the automatic operation of said tuning means upon the actuation of said manual means.

14. In a radio receiving set, in combination with a plurality of adjustable tuning members, a plurality of actuators, a plurality of stops carried thereby, means for moving said actuators, a plurality of selectors, a plurality of stops carried thereby adapted to cooperate with the stops of said actuators, means for effecting a relative adjustment between said stops on said selectors and said actuators, means for effecting a relative shifting movement between certain of said selector stops and said actuator stops to selectively determine the travel of the actuators, manually operative means, and connections between said manual means, said selectors and said actuators for controlling the actuation of the same upon the operation of said manual means.

15. In combination with a radio receiving set, a plurality of adjustable tuning means thereon, a plurality of movable actuators, a plurality of stops thereon, a plurality of selectors disposed across the path of travel of said actuators, adjustable stops carried by said selectors, means for shifting said selectors selectively, whereby to position certain of said stops thereon in the path of travel of the stops carried by said actuator, manually operative means, and connections therefrom to said selectors and to said actuators for effecting the actuation of the same.

16. In combination with the tuning means of a radio receiving set, a movable actuator therefor, means for connecting said actuator to said tuning means, means for moving said actuator, a selector, adjustable means carried by said selector and said actuator for selectively determining the amount of travel of said actuator, manually operative means, means actuated in response to the actuation of said manually operable means for operating said selector and said actuator, contacts operably connected to a circuit part of the radio receiving set, and means actuated by the operation of said manually operative means for controlling the operation of said contacts upon the operation of said selector and actuator.

17. In combination with a plurality of tuning dials on a radio receiving set, a plurality of actuators each connected to a tuning dial, a plurality of selectors each disposed across the path of travel of an actuator, means for moving said actuators, means for moving each selector, a plurality of stops carried by each selector, a plurality of stops carried by each actuator, means for effecting relative adjustment between the stops on the selectors and the stops on the actuators, manually operated means, connections between said manual means and said selectors and said actuators for automatically shifting the desired selector whereby to move the stops thereof into the path of travel of the stops on the actuators, and for automatically shifting said actuators, relatively movable contacts each connected to a circuit part of the radio receiving set, a member adapted to move said contacts relatively to open and close the same, and means operatively connected to each selector for shifting said member upon the operation of a desired selector.

18. In combination with a plurality of tuning means of a radio receiving set, a plurality of movable actuators, a plurality of stops carried by each actuator, electro-magnetic means for shifting said actuators, a plurality of selectors arranged in spaced relation across the path of travel of said actuators, electro-magnetic means adapted to shift the selectors, a plurality of stops carried by each selector, a spring adapted to return each selector to normal position after it has been shifted in one direction by its electro-magnet, contact means connected to a circuit part of the radio receiving set, a member adapted to control said contact means, a plurality of fingers each connected to said member and a lug carried by each selector adapted to cooperate with a finger whereby to move said member upon the actuation of a selector, manually operative means, an electrical connection therefrom to each electro-magnet and to electro-magnetic means for actuating said actuators.

19. In combination with a radio receiving set having a plurality of tuning means, a plurality of actuators each connected to a tuning means, an actuator electro-magnet, an armature therefor, a plurality of fingers each carried by an actuator, an upstanding lug on said armature, resilient means adapted to be interposed between said fingers and said lugs, stops carried by said actuators, a plurality of stops adapted to be interposed in the path of travel of the stops on said actuator, means for effecting a relative adjustment between said stops, and means for selectively positioning certain of said stops whereby to selectively determine the amount of travel of said actuators.

20. In combination with a plurality of tuning means of a radio receiving set, a plurality of actuators, means for moving the same, a plurality of stops carried by said actuators, a plurality of cooperative stops adapted to be disposed in the path of travel of the stops carried by said actuators, means for effecting a relative adjustment between said stops, and means for selectively positioning certain of said stops in the path of travel of said actuator stops whereby to selectively determine the amount of travel of said actuators.

21. In combination with the adjustable tuning dials of a radio receiving set, a plurality of brackets adapted to be fastened to the support of said radio receiving set, an oscillatable sector mounted on said brackets, a cap adapted to be detachably fastened on said dial, said cap having teeth thereon adapted to mesh with said sector, an oscillatable arm connected to said sector, a plurality of actuators, connections from said actuator to each arm of a sector, means for moving said actuators, a plurality of stops carried by each actuator, a plurality of stops adapted to be operatively positioned in the path of travel of said stops on said selectors, means for effecting the relative adjustment of said stops, manually operative means, and automatic means connected thereto and to said actuator bars and to certain of said stops to selectively shift certain of said stops in the path of travel of the stops on said selector bars and to shift said selector bars.

22. In combination with shiftable tuning means of a radio apparatus, a plurality of actuators connected thereto and each having a series of stops, a plurality of selectors having cooperative stops, manually operable means, and devices actuated in response to the actuation of said manually operable means for shifting a desired selector and the actuators to effect tuning.

23. In combination with a volume control of a radio receiving set, a shiftable member, manually operable means, connections from said member to said volume control, oppositely disposed ratchet teeth carried by said member, a shiftable arm for each set of teeth, a pawl carried by each arm and adapted to engage a set of teeth, and means for selectively operating said pawls from said manual means whereby to determine the adjustment of said control means.

24. In a radio receiving apparatus, the combination of a shiftable tuning member, manually operable means, automatic means actuated in response to the operation of said manually operable means for shifting the tuning means a desired amount and for making a circuit connection of the radio apparatus, and automatic means for shifting the tuning means to neutral position and for breaking the circuit connection.

25. In combination with a rotatable tuning dial of a radio apparatus, an actuator connected thereto, power means for shifting said actuator, a plurality of stops, manually operable means and devices constructed and arranged for causing the automatic operation of preselected stops and the automatic operation of the actuator when said manually operable means is moved.

26. In combination with shiftable tuning means, a reciprocable actuator, a selector, manually operable means and devices for automatically actuating said actuator and selector upon the operation of said manually operable means, said actuator and selector having cooperative stops constructed and arranged to hold said selector in shifted position after being operated.

27. In combination, a rotatable tuning dial, a reciprocable member connected to the dial, power means for automatically reciprocating said member to effect a desired setting, and a dash-pot for cushioning the movement of said member during setting.

28. In combination, a shiftable tuning member, power operated means for automatically shifting said member to effect a desired setting, and means for automatically controlling the rate of movement of said member only during the setting operation.

29. In combination with a rotatable tuning dial of a radio apparatus, manually operable means, devices actuated by the operation of said means for automatically rotating the tuning dial, and means for controlling the speed of rotation of said dial in one direction of rotation for effecting a desired setting while permitting free rotation in the other direction.

30. In combination with a rotatable tuning dial of a radio apparatus, manually operable means, means actuated by the operation of said manually operable means for automatically rotating the tuning dial, and braking means for checking the speed of rotation during the turning thereof.

31. In a device of the character described, tuning means, a solenoid and an armature therefor for actuating the tuning means, and magnetically actuated selector means controlling the position of said armature and tuning means.

32. In a device of the character described, tuning means, a solenoid and an armature therefor for actuating the tuning means, and magnetically actuated selector means controlling the position of said armature and tuning means, and a plurality of manually operated station selectors operatively connected to said selector means.

33. Radio apparatus comprising an adjustable rotary tuning element, slidable means for actuating said tuning element, a plurality of selectively operable push buttons corresponding respectively to different predetermined positions of the tuning element, and means under the control of each of said push buttons for moving the slidable means to actuate the tuning element to the adjusted position corresponding to the selected push button.

34. Radio apparatus comprising an adjustable tuning element, means including a motor for moving the tuning element to different predetermined positions, a plurality of selectively operable push buttons each corresponding to one of said predetermined positions, and means under the control of each of said push buttons for energizing the motor and causing it to actuate the tuning element to the position corresponding to the actuated push button.

35. The combination, with an adjustable tuning element of a radio receiving system, of a plurality of selectively operable push buttons, electrical means acting upon the selective operation of said push buttons to effect movement of said tuning element to respectively different positions, said electrical means comprising a motor device and a plurality of position determining means each of which corresponds to a different position of the tuning element, the operation of a selected push button serving to energize the motor device and to cause the position determining means corresponding to the selected push button to be effective.

36. The combination, with an adjustable tuning element of a radio receiving system, of a motor for actuating the tuning element, a plurality of members for determining the position to which the tuning element is actuated, and a plurality of selectively operable push buttons, each of which is operatively related to one of the position determining members, whereby upon the selective operation of any push button the motor is energized to actuate the tuning element, and the position determining member corresponding to the operated push button is made effective to stop the motor at the desired position of adjustment of the tuning element.

37. The combination, with an adjustable tuning element of a radio receiving system, of a plurality of position determining means movable with the tuning element, each thereof corresponding to a different predetermined position of said tuning element, normally in operative stop members adapted when actuated to coact with the respective position determining means to effect adjustment of the tuning element to different predetermined positions, a plurality of selectively operable push buttons each acting upon the selective operation thereof to actuate one of the stop members, and means for actuating the tuning element until the actuated stop member and its corresponding position determining means coact with each other to stop the tuning element in adjusted position.

38. A tuning unit for radio apparatus, comprising a movable tuning element, driving means for said element, stop means movable between operative and inoperative positions for limiting the movement of said tuning element to a predetermined position, and a manually operable element adapted upon actuation both to move the stop means to operative position and to initiate operation of the driving means.

39. A tuning unit for radio apparatus, comprising a movable tuning element, driving means for said element, stop means movable between operative and inoperative positions for limiting the movement of said tuning element to a predetermined position, resilient means tending to move the stop means toward inoperative position, and a manually operable member adapted upon actuation both to move the stop means to operative position and to initiate operation of the driving means, whereby said tuning element will be stopped at said predetermined position under the influence of said stop means.

40. An automatic radio tuning control comprising a tuning element, means for actuating the same, a plurality of push buttons controlling the actuating means, a plurality of stop members corresponding in number with the push buttons and operatively connected with the tuning element, and a cooperating stop member under the control of each push button selectively movable into the path of its corresponding stop member to limit the movement of the tuning element.

41. The combination of a radio tuning element, a set of movable stops, said stops representing certain stations, a plurality of spaced means movable with said tuning element for selectively engaging said stops, electrical means for operating a selected stop to arrest said tuning element in a predetermined tuning position, and means whereby any operated stop is caused to remain in stopping position after said electrical means has been deenergized.

42. In a radio broadcast receiving set having a tuning element, means for adjusting the tuning element including adjustable stop members adapted to be set at predetermined positions corresponding to exact broadcast station frequencies and adapted to lock said adjusting means when said tuning element is adjusted to said station frequencies, whereby said adjustable stop members remain in station-selecting position, and means independent of said members for operating said tuning element until arrested by an adjusted stop member, said stop members, being incapable of operating said tuning element.

43. The combination of a radio tuning shaft, means for manually operating said shaft, a plurality of members operatively connected with said shaft, each member representing a selected station, an adjustable stop member adapted to coact with each of said first mentioned members and normally out of operative relation thereto, whereby said shaft is normally free to be rotated by hand in either direction through its whole tuning range, said stop members being individually operable, and electrical, push button controlled means associated with each of the stop members for moving it to operative position to stop said shaft in predetermined tuning position determined by adjustment of the stop member which is moved to operative position.

44. An automatic radio control comprising a tuning element, electrically actuated means for tuning said element including a plurality of push buttons, an electrically actuated switch for closing a circuit to said tuning element actuating means, each of said push buttons when depressed closing a circuit for actuating said switch, a selector member associated with each push button and being movable into operative position by actuation of its push button, and a plurality of stops movable with the tuning element one of which is adapted to engage a corresponding selector member, when the latter is moved to its operative position, for preventing further movement of said tuning element.

45. The combination of a radio receiver having a tuning element, electrical mechanism for operating said element, a series of separately actuatable stops movable into and out of operative position, selectively operable means for controlling the position of each stop, and a plurality of members movable with said tuning element, each adapted to engage one of said stops when in operative position for limiting the movement of said tuning element to predetermined positions, each of said stops and its cooperating member being adjustable relatively to each other whereby each desired position of said tuning means may be adjustably predetermined, said stops being substantially immovable when engaged by said members, so that said tuning element is stopped mechanically in selected tuning position.

46. The combination of a radio receiver having a tuning element, electromagnetic mechanism for moving said element to a plurality of predetermined tuning positions, a series of separately adjustable stops movable into and out of operative position, a plurality of members operatively connected with said tuning element and each adapted to engage one of said stops for limiting the movement of said element, said stops being substantially immovable when engaged by said members, so that said tuning element is stopped mechanically in selected tuning position, and selectively operable electromagnetic means for controlling the position of each stop.

47. The combination of a radio receiver having a tuning element, electromagnetic mechanism for moving said element to different, predetermined positions, a plurality of electromagnetic devices for limiting the movement of said element to predetermined amounts, each device representing a station to be tuned in, a plurality of hand-operable members, one for each of said devices, a pair of normally open switches adapted to be closed by each member when the same is actuated, one switch energizing one of said devices and the other switch energizing said mechanism, and means whereby the first mentioned switch is closed in advance of the other switch for energizing any one of said devices in advance of said mechanism.

48. In combination, a shiftable tuning member, electrical means for automatically actuating said member including a solenoid and a core, said solenoid and core being constructed and arranged to form a dash-pot to cushion the movement of the core within the coil of the solenoid.

49. In combination, a shiftable tuning member, electrical means for automatically actuating said member including a solenoid and its core, the hollow of the solenoid forming a closed chamber and the core having a fluid passage therethrough controlled by a one-way valve to cushion the core in one direction, whereby to effect a retarded setting movement of the tuning member.

50. In combination, tuning means for a radio apparatus capable of being shifted to various positions of adjustment, a plurality of manually operable members, and means actuated in response to the operation of any selected one of such members for automatically and selectively shifting the tuning means for effecting a selected frequency setting of the tuning means and for automatically controlling a circuit part of the radio apparatus.

51. In a radio apparatus, shiftable tuning means, means for automatically shifting the tuning means at one rate of speed during the setting movement and for automatically shifting the tuning means at another rate of speed when the tuning means is returning to neutral position.

52. The combination, with an adjustable tuning element of a radio receiving system, of a plurality of selectively operable push buttons, and means acting upon the selective operation of said push buttons to effect adjustment of said tuning element to respectively different positions.

53. In an automatic-tuning radio control, a shaft, a tuning element having an adjustable part carried by said shaft, means for rotating said shaft, a second shaft geared to the first-named shaft, and stop means associated with the said second shaft for selectively limiting the movement of the first-named shaft.

54. In a radio receiver, a tuning element, an actuating device for operating said element, means for predeterminedly limiting the movement of said element, and manually-actuated means for controlling both the actuating device and the limiting means.

55. In a radio receiver, a tuning element, automatic means for variably adjusting said element, stop means for limiting the adjustment of said tuning element and an impositive, operative connection between said automatic means and said stop means.

56. In a distant control apparatus for radio receiving apparatus embodying a tuning device, a motor adjacent the receiving apparatus operatively connected to said tuning device to effect adjustment of the latter, a control element adjacent the receiving apparatus for throwing the motor into and out of operation, motive means adjacent the receiving apparatus for actuating said control element, means located at a point distant to said receiving apparatus for controlling the operation of said motive means, and means for controlling the volume of reproduction of said receiving apparatus from said distant point.

57. A combination including an adjustable controlling element for radio apparatus, a motive device for operating said element, a plurality of selectively operable means for controlling said motive device to cause it to operate said element to any one of a predetermined number of positions, and a plurality of adjustable means driven by said motive device, one for each selectively operable means, for stopping the motive device when it has operated said element to a position determined by the actuated selectively operable means and the adjustment of the corresponding adjustable means.

58. A control for a radio receiving set comprising a rotatable tuning unit carrying shaft, means for moving said unit shaft including a longitudinally movable stop shaft, stops on the shaft, and means for selectively engaging the stops on said stop shaft for arresting the movement of said stop shaft when the receiving set is tuned to a predetermined broadcasting station, by said unit shaft moving means.

59. The combination with tuning apparatus, of a slidable frame member cooperating with the tuning apparatus, a plurality of limiting means carried by said frame member, and selectively operable means cooperating with a predetermined one of said limiting means to limit the movement of said frame member.

PERCY F. RICE.